(12) United States Patent
Krech (10) Patent No.: US 12,235,181 B2
(45) Date of Patent: Feb. 25, 2025

(54) METHOD FOR CAPTURING A LOAD SPECTRUM AND LOAD-SPECTRUM CAPTURING DEVICE

(71) Applicant: core sensing GmbH, Darmstadt (DE)

(72) Inventor: Martin Krech, Mühltal (DE)

(73) Assignee: core sensing GmbH, Darmstadt (DE)

(*) Notice: Subject to any disclaimer, the term of this patent is extended or adjusted under 35 U.S.C. 154(b) by 0 days.

(21) Appl. No.: 17/713,364

(22) Filed: Apr. 5, 2022

(65) Prior Publication Data
US 2024/0230466 A1 Jul. 11, 2024

(30) Foreign Application Priority Data
Apr. 11, 2021 (DE) ............... 10 2021 108 964.6

(51) Int. Cl.
G01M 13/021 (2019.01)
G01L 5/00 (2006.01)
G01M 17/007 (2006.01)

(52) U.S. Cl.
CPC ......... G01M 13/021 (2013.01); G01L 5/0009 (2013.01); G01M 17/007 (2013.01)

(58) Field of Classification Search
CPC .. G01M 13/021; G01M 17/007; G01L 5/0009
See application file for complete search history.

(56) References Cited

U.S. PATENT DOCUMENTS

| 9,315,970 | B2* | 4/2016 | Chitty | G07C 5/006 |
| 2009/0287381 | A1* | 11/2009 | Heidrich | B66C 13/16 |
| | | | | 701/50 |
| 2017/0199101 | A1* | 7/2017 | Franchitti | B61L 15/0027 |

FOREIGN PATENT DOCUMENTS

| DE | 29593416 U1 | 7/1995 | |
| DE | 102005048531 A1 * | 4/2007 | F16D 48/06 |
| DE | 102011079157 A1 * | 1/2013 | H02K 5/15 |
| DE | 102011079157 B4 * | 6/2017 | H02K 5/15 |
| DE | 102018111019 A1 * | 11/2019 | F16L 11/11 |
| DE | 102019211693 A1 * | 2/2021 | |

\* cited by examiner

*Primary Examiner* — Jamel E Williams
(74) *Attorney, Agent, or Firm* — WRB-IP PLLC (57) ABSTRACT

A method is provided for capturing a load spectrum of mechanical stresses which act on a machine element during an intended use. Mechanical stresses acting on the machine element are captured by a measuring apparatus of a load-spectrum-capturing device arranged on or in the machine element over a capturing period. Proceeding from the measured data acting on the machine element and captured by the measuring apparatus, a load spectrum depicting the mechanical stresses acting on the machine element is determined. In this method, partial load-spectrum data are calculated at time intervals by a load-spectrum-determining apparatus of the load-spectrum-capturing device proceeding from the captured measured data and the partial load-spectrum data are stored in a data-memory apparatus of the load-spectrum-capturing device. The partial load-spectrum data determined over the capturing period form a load-spectrum data set of a load spectrum.

12 Claims, 3 Drawing Sheets

METHOD FOR CAPTURING A LOAD SPECTRUM AND LOAD-SPECTRUM CAPTURING DEVICE

BACKGROUND AND SUMMARY

The invention relates, according to an aspect thereof, to a method for capturing a load spectrum of mechanical stresses which act on a machine element during an intended use, wherein mechanical stresses acting on the machine element are captured by means of a measuring apparatus of a load-spectrum-capturing device arranged on or in the machine element over a capturing period, and wherein, proceeding from the measured data acting on the machine element and captured by the measuring apparatus, a load spectrum depicting the mechanical stresses acting on the machine element is determined.

A machine element can sustain damage due to a single event involving excessive mechanical stress. It is also known from practice that the machine element can also be compromised by mechanical stress that does not lead directly to damage, but causes damage over a period of time, and the machine element is weakened and ultimately damaged or its useful life is limited due to accumulated mechanical stress.

In order to capture the effects of accumulating mechanical stress in an improved manner and to be able to estimate a remaining low-risk useful life where necessary, it is known from practice that, for the machine element, a load spectrum is determined which depicts the time curve of the mechanical stress and, for example, allows a remaining service life to be estimated within which the machine element can still be used as intended without the risk of sudden failure increasing excessively.

In order to determine the load spectrum, suitable measuring apparatuses are usually arranged on or in the machine element and characteristic load variables of mechanical stress acting on the machine element are captured by means of the measuring apparatus. On the basis of the captured characteristic load variables, a load spectrum can then be determined using known processes and calculation methods. The load spectrum is usually determined in an analysis step, which is carried out once the capturing of all the characteristic load variables has ended. In order to design the measuring apparatus to be as cost-effective as possible, the analysis step is routinely carried out by means of a separate analysis apparatus, which is spatially separate from the measuring apparatus or machine element. In this process, the measured data captured by means of the measuring apparatus can be transmitted to the analysis apparatus in a wired or wireless manner on the basis of the machine element in question and the measuring apparatus used. The measuring apparatuses and analysis apparatuses known from practice are suitable in particular for individually determining load spectra which are determined using prototypes or individual selected machine elements and are used and analyzed with regard to an adaptation and future design of the machine element in question, for example. For permanently monitoring machine elements that are used as intended, the effort involved in capturing and analyzing the measured data is often uneconomically high.

It is desirable to configure a method for determining a load spectrum such that it is possible to capture a load spectrum with as little effort as possible over the longest possible period of time.

According to an aspect of the invention partial load-spectrum data are calculated at time intervals by means of a load-spectrum-determining apparatus of the load-spectrum-capturing device proceeding from the captured measured data and the partial load-spectrum data are stored in a data-memory apparatus of the load-spectrum-capturing device, wherein the partial load-spectrum data determined over the capturing period form a load-spectrum data set of a load spectrum. In this way, large sets of measured data do not need to be stored and transmitted to an analysis apparatus. The load-spectrum data in the load-spectrum data set determined proceeding from the captured measured data represent, with a comparatively small data set, the essential information from the measured data captured over a long period of time.

According to an aspect of the invention, the determining of a load spectrum includes all the known analysis and reduction methods by means of which statements can be obtained regarding the mechanical stress on the machine element. In particular, by means of the load-spectrum-determining apparatus, any classifications and counting processes can be carried out by means of which information regarding operational stability or a remaining service life of the machine element can be determined or estimated. The parameters for the analysis and reduction methods can be predetermined in advance and stored in the load-spectrum-determining apparatus. It is also possible for the load-spectrum-determining apparatus to carry out a training step at the start of the intended use of the load-spectrum-capturing device for definable or dynamically adaptable training duration and in the process to first determine individual parameters which are then used for calculating the partial load-spectrum data. It is also conceivable for the load-spectrum-determining apparatus to perform a calculation of the partial load-spectrum data that is increasingly adapted to the machine element and its individual use by means of artificial intelligence.

The load-spectrum data that are determined from the analysis of the measured data over an elapsed capturing time period are referred to as partial load-spectrum data. As the capturing period increases, an increasingly large amount of measured data can be taken into account, such that updated partial load-spectrum data can always be determined. In this case, the partial load-spectrum data that are the most up to date at any one time correspond to the load-spectrum data that form the load spectrum that is the most up to date at that point in time. Until partial load-spectrum data is subsequently determined again, the measured data are intermediately stored in the load-spectrum-capturing device. The subsequent determination of new partial load-spectrum data then takes into account old partial load-spectrum data that is already present and the measured data that has been intermediately stored since the last time the old load-spectrum data was determined. The data memory required for intermediately storing the measured data is adapted to the time intervals for determining the partial load-spectrum data and to the frequency and the scope of the measured data captured up to that point. Each time that the new partial load-spectrum data are determined, the new, updated partial load-spectrum data are stored in addition to old partial load-spectrum data or overwrite this old partial load-spectrum data. If old partial load-spectrum data are retained and not overwritten, a change in the partial load-spectrum data can also be captured and analyzed by the load-spectrum-capturing device in order to identify systematic trends, for example, or to observe sudden changes in the partial load-spectrum data that can point to unusual events or impact the remaining service life of the machine element.

On the basis of the load-spectrum data, a precise and conclusive analysis can be carried out at a given time without drawing on the considerably more comprehensive measured data. As a result, with a comparatively long capturing period, the memory requirements of a data-memory apparatus for the load-spectrum data can be pre-determined to be significantly lower than would be required if the measured data were continually stored. The effort involved in transmitting the load-spectrum data to an analysis apparatus is also considerably reduced.

By contrast with storage and subsequent transmission of measured data, the effort both for the storage and the transmission of the load-spectrum data is considerably lower. The load-spectrum data can be transmitted within a very short transmission period and requires very little energy for wireless transmission from the load-spectrum-capturing device to an external analysis device, for example. Even if data is transmitted comparatively frequently, the amount of energy required for the data transmission is lower, meaning that the load-spectrum-capturing device can be operated without an external energy supply for a long period of time. The installation space required for the load-spectrum-capturing device comprising a suitably dimensioned energy-storage apparatus is very low, and therefore the load-spectrum-capturing device is suitable for use with many machine elements and its intended use is not significantly affected.

The method according to an aspect of the invention also makes it possible to monitor, in an economically sensible manner, many different machine elements for which the effort required previously seemed too high and therefore a load spectrum was only captured infrequently or on prototypes. The effort involved in manufacturing and assembling a load-spectrum-capturing device required for carrying out the method is low compared with the previously known components, and therefore carrying out the method on many different machine elements and in many different applications is justified and advantageous.

According to one configuration of the concept of an aspect of the invention, it is provided that the load-spectrum data set is read out from the data-memory apparatus of the load-spectrum-capturing device and analyzed in a subsequent analysis step only once an intended use of the machine element has ended. For example, the intended use has ended once the machine element has been replaced because it is damaged or the intended useful life has elapsed. The intended use of the machine element can also end because the machine in which the machine element is used has been damaged and a cause for the damage to the machine can potentially be determined on the basis of the information obtained in the load-spectrum data set. An intended use of the machine element can also end by the operation of the machine simply being stopped, in order to carry out maintenance on the machine element or the machine, for example. The planned shutdown of the machine, for example at the end of a working day, ends the intended use of the machine element, which can then be restarted and can continue being used again.

The method according to an aspect of the invention makes it possible, for example, to arrange the load-spectrum-capturing device on or in a machine element so as to be inaccessible from the outside for a long period of time and to collect load-spectrum data without data needing to be transmitted constantly or frequently, in order to keep the effort involved in the relevant data transmission low. The load-spectrum-capturing device can also be arranged in a cavity in a machine element that is not accessible from the outside and can remain in the cavity for the useful life of the machine element without the captured load-spectrum data being transmitted during the useful life. Once the use of the machine element has ended, for example if the machine element is damaged, the load-spectrum data stored in the data-memory apparatus can be read out from the load-spectrum-capturing device and analyzed. The stored load-spectrum data can also be read out at time intervals during the intended use or when the use is stopped, for example for maintenance purposes. In this way, conclusions can be drawn on the preceding use of the machine element and a potential cause of damage that is starting to become apparent or damage to the machine element that has actually already been done can be ascertained. By means of the method according to an aspect of the invention, even when damage occurs early, it is easier to clarify the cause and provide the option of modifying machine elements of this kind where necessary and designing them advantageously in the future.

According to a particularly advantageous configuration of the concept of an aspect of the invention, it is provided that, once partial load-spectrum data have been stored in the data-memory apparatus, a damage-occurrence estimation step is carried out and, proceeding from the partial load-spectrum data stored in the data-memory apparatus, a characteristic damage variable is determined for a probability measure of a predetermined damage occurrence to the machine element coming about in the future. In many cases, a characteristic damage variable determined in a suitable manner is the decisively relevant information necessary for assessing whether the machine element should continue to be used or whether it should undergo maintenance or be replaced. In these cases, comprehensive analysis of the load-spectrum data can then be omitted, meaning that the effort involved in monitoring the machine element can be further reduced.

In addition, the characteristic damage variable can be determined by the load-spectrum-capturing device automatically and at predetermined time intervals, for example. By the characteristic damage variable being determined and checked sufficiently frequently, a failure of the machine element that would otherwise have been surprising can often be predicted in good time and also prevented as a result just by means of the load-spectrum-capturing device. It is also possible for the determination of the characteristic damage variable to be initiated from outside the load-spectrum-capturing device or to be triggered at regular or irregular time intervals. In the event of a significant deviation in the captured characteristic damage variable from a predetermined reference characteristic variable, a warning can be generated or warning information can be transmitted to an external analysis apparatus, for example.

It is optionally provided that, after carrying out a damage-occurrence estimation step, the characteristic damage variable determined during this step is transmitted to an external analysis apparatus by means of a data-transmission apparatus of the load-spectrum-capturing device. If, at a later point in time, only the characteristic damage variable is of interest, the data transmission can be limited to just one data unit or to the characteristic damage variable at a given time. The effort required for this is very low, both in terms of the data storage and the data transmission. Therefore, for transmitting the characteristic damage variable, data-transmission apparatuses or transmission methods can also be used which, in the case of larger data sets, are not expedient or are uneconomical, but can reliably transmit individual pieces of information, such as the characteristic damage variable, to an external receiving and analysis apparatus.

According to a particularly advantageous configuration of the concept of an aspect of the invention, it is provided that component parameters of components of a machine that are operatively connected to the machine element are stored in a component data-memory apparatus of the load-spectrum-capturing device and characteristic damage variables for the components that are operatively connected to the machine element are determined in the damage-occurrence estimation step. The machine element can for example be a shaft, a traction or pressure mechanism or another component within an operative-connection apparatus which comprises a plurality of components and by means of which forces or moments can be transmitted or exerted over a plurality of components. The operative-connection apparatus is, for example, a drive train of a drive unit or a processing machine in a production or processing system. In many cases, it can be at least approximately assumed that the measured data for the mechanical stress acting on the machine element, which data is captured by means of the measuring apparatus on or in the machine element, is also representative of mechanical stress on adjoining components. Therefore, for example, during the operation of a drive unit of a plurality of components interconnected for conjoint rotation within a drive train of the drive unit, the same torque is transmitted in each case, such that the measured data captured on or in the machine element as a component within the drive train allows conclusions to be drawn on mechanical stress on the adjoining components or even all the components within the drive train. Therefore, for example by arranging the load-spectrum-capturing device in a machine element, designed as a hollow-shaft portion, within the drive train of a vehicle, information regarding mechanical stress on a gearbox or clutch apparatus within this drive train can be captured and collected by means of the load-spectrum-capturing device in the hollow-shaft portion.

It is not necessary to provide a separate load-spectrum-capturing device for each component and to carry out corresponding methods in parallel. Only the relevant component parameters need to be determined and stored in the component data-memory apparatus of the load-spectrum-capturing device. On the basis of these stored component parameters and the measured data determined by means of the measuring device of the load-spectrum-capturing device over the capturing period, partial load-spectrum data can be determined for each of a plurality of components and can be stored in the data-memory apparatus. Proceeding from the load-spectrum data that have been determined and stored for the individual components, separate characteristic damage variables can then be determined in each case and can also be stored or, alternatively, transmitted to an external receiving and analysis apparatus.

The measuring apparatus of the load-spectrum-capturing device can also be used during the capturing period to capture the same measured data or additionally captured measured values that are not required for determining the load spectrum but can optionally be used for operating the machine element or a machine comprising the machine element. For this purpose, according to a particularly advantageous variant of the concept of an aspect of the invention, it is provided that the measured data captured by means of the measuring apparatus are transmitted to an external analysis or control apparatus relevant to the operation of the machine element or the machine by means of a measured-data transmission apparatus during the intended use of the machine element. The external analysis or control apparatus can be part of the machine and can, for example, bring about or influence control or regulation of the machine element in question or the entire machine. The measured-data transmission apparatus can be the same data-transmission apparatus that is also used for transmitting the load-spectrum data or the characteristic damage variables. It is likewise conceivable for the load-spectrum-capturing device to comprise two separate or even two different transmission apparatuses, wherein the data-transmission apparatus is used for transmitting the load-spectrum data or the characteristic damage variables to an external analysis apparatus while the measured-data transmission apparatus is used for transmitting the measured data to a control apparatus of the machine.

It is preferably provided that the measured-data transmission apparatus is configured and provided for real-time-capable transmission of the measured data. The measured data can accordingly be transmitted in such a manner that reliable operation and corresponding control or regulation of the operation of the machine element or the entire machine is made possible by means of the analysis and control apparatus. By contrast, a data-transmission apparatus for transmitting the captured partial load-spectrum data does not have to be real-time capable. In many cases, non-real-time-capable data transmission of the captured partial load-spectrum data is not necessary, and therefore less complex and in particular more energy-saving data-transmission methods can be used.

In order to facilitate the longest possible duration of energy-self-sufficient operation of the load-spectrum-capturing device in particular when the load-spectrum-capturing device is arranged on or within a machine element in a manner shielded from the environment, it is optionally provided that, following a standby-state-initiating event, the load-spectrum-capturing device is transferred into an energy-saving standby state in which no measured data are captured by means of the measuring apparatus. Therefore, for example using a motion sensor integrated in the load-spectrum-capturing device, a movement that occurs during the intended use of the machine element can be monitored and, after a relatively long period without any movement of the machine element, a standby-state-initiating signal can be generated, by means of which the load-spectrum-capturing device is transferred into the standby state. A standby-state-initiating signal can also be transmitted to the load-spectrum-capturing device from outside the machine element, for example from a user of the machine or from a control apparatus of the machine, in order to initiate the standby state. During the standby state, the energy-intensive process sequences within the load-spectrum-capturing device can be reduced or carried out less frequently. It is likewise possible not to carry out individual method steps, such as data transmission, or to only carry them out infrequently, while other method steps, such as capturing measured data, are carried out unchanged or with fewer restrictions.

In a corresponding manner, it can optionally be provided that, by means of an activation event, the load-spectrum-capturing device is transferred into an operating state in which measured data are captured by means of the measuring apparatus and partial load-spectrum data are calculated and stored at time intervals proceeding from the captured measured data. The load-spectrum-capturing device can be installed in a machine element in a standby state, for example. The load-spectrum-capturing device can be activated and in turn put into operation only after the machine element is delivered or after the machine comprising the machine element is put into operation. It can also be activated once the previously active load-spectrum-capturing device has already been transferred into the standby state. In this case, the activation event can be generated from outside the load-spectrum-capturing device and can be transmitted to the load-spectrum-capturing device as an activation signal. It is also conceivable for the load-spectrum-capturing device to comprise an activation sensor, for example a motion sensor, which identifies the start of the use of the machine element and then prompts the load-spectrum-capturing device to be transferred into the operating state.

According to a particularly advantageous configuration of the concept of an aspect of the invention, it is optionally provided that a time curve of the measured data captured by means of the measuring apparatus is compared with a plurality of previously predetermined reference curves and, when the time curve of the measured data corresponds to a reference curve, as established in accordance with predetermined correspondence criteria, partial load-spectrum data are stored for a separate reference-curve load spectrum allocated to this reference curve. Provided that the intended use of the machine element or a machine of which the machine element in question is a part is known in advance and different usage sequences can be identified within this use, a separate load spectrum can be determined for each of these different usage sequences. Therefore, for example, different materials can be machined using a drilling or milling machine, wherein the mechanical stress during the machining of soft materials is different and usually lower than during the machining of hard materials. For different materials, different reference curves for the measurable stress can be determined in advance during a machining process and stored in the load-spectrum-capturing device. While capturing the measured data using the measuring apparatus, the time curve for the measured data can be compared with the respective reference curves and, once it has been established that the curve of the measured data and a reference curve correspond sufficiently using known comparison methods, the captured measured data for the mechanical stress can be allocated to a separate load spectrum for this usage sequence or reference curve. As a result, the measured data can be analyzed and prepared even while the partial load-spectrum data is being determined, which makes later analysis of the load-spectrum information easier.

The invention also relates, according to an aspect thereof, to a load-spectrum-capturing device comprising a measuring apparatus for capturing mechanical stresses. Load-spectrum-capturing devices are known from practice which merely comprise a measuring apparatus, the measured data from which is read out and then analyzed.

It is considered to be another aspect of the invention to configure a load-spectrum-capturing device such that it is possible to capture a load spectrum on or in a machine element with as little effort as possible over the longest possible period of time.

What is provided according to an aspect of the invention is a load-spectrum-capturing device comprising a load-spectrum-determining apparatus for determining load-spectrum data, comprising a data-memory apparatus for storing the determined load-spectrum data, and comprising a data-transmission apparatus for transmitting load-spectrum data to an external receiving apparatus for load-spectrum data.

By means of the load-spectrum-determining apparatus, the measured values captured by means of the measuring apparatus can be processed within the load-spectrum-capturing device and load-spectrum data can be determined of which the data volume is quite considerably lower than the data volume of the measured data but which still contains all the information required for capturing an accumulating mechanical load and making it possible to estimate a remaining service life. The load-spectrum data can be permanently stored in the load-spectrum-capturing device by means of a comparatively compact data-memory apparatus. The data-memory apparatus can be limited to a few kilobytes or megabytes of digital data, for example, and can be part of a microcontroller which also comprises the load-spectrum-determining apparatus. The data-memory apparatus can also be a permanent flash memory or a solid-state memory medium, for example.

The data-transmission apparatus can provide a transmission channel via which the load-spectrum data can be transmitted to an external receiver or receiving apparatus. In this process, the data can be transmitted via broadband, Bluetooth, or via WLAN or WPAN, for example. It is also possible to transmit the data over a mobile phone network or by means of corresponding transmission protocols such as GSM or 5G. In particular, when transmitting only very low data volumes, a transmission method which is limited in this respect, such as active or passive transponder technology, in particular RFID technology, can also be used. The data-transmission apparatus can, but does not have to be, configured and operated so as to be real-time capable.

Preferably, it is optionally provided that the load-spectrum-capturing device comprises an energy-supply apparatus, which can provide electrical energy for operating the load-spectrum-capturing device from an energy-storage apparatus of the load-spectrum-capturing device. The energy-storage apparatus can be a battery or an accumulator which supplies the measuring apparatus and the load-spectrum-capturing device with electrical energy via the energy-supply apparatus. All the parts of the load-spectrum-capturing device can be configured to be as energy efficient as possible, such that the energy-storage apparatus can be compact but still facilitate the intended operation of the load-spectrum-capturing device over months or years. The load-spectrum-capturing device can then for example be arranged in a cavity in a machine element without a permanent connection to an external energy-supply apparatus and can optionally be arranged so as to be completely encapsulated or embedded in the machine element but still capture load-spectrum data over a long capturing period. The captured and stored load-spectrum data can either be transmitted from the load-spectrum-capturing device to an external analysis apparatus at time intervals, for example wirelessly, which is possible without high energy consumption due to the low data volume of the load-spectrum-capturing device, or can remain in the load-spectrum-capturing device until the machine element is accessible again and the load-spectrum-capturing device can be disconnected from the machine element and read out. In this way, the load-spectrum-capturing device can also be used as a passive data logger in plant-relevant or system-relevant machine elements in order for it to be possible to provide information regarding the mechanical stresses on the machine element that occurred in the past following damage, for example.

Even if the load-spectrum-capturing device is intended to be permanently connected to an external energy supply of the machine element or the machine in question, a separate energy-storage apparatus can be expedient. Therefore, for example after switching off the machine or its energy supply, operation of the load-spectrum-capturing device can be continued and any mechanical stresses that continue to occur can be reliably captured. In addition, despite an external energy supply being deactivated, load-spectrum data is transmitted by means of the load-spectrum-capturing device.

In order for it to be possible to configure the useful life of the load-spectrum-capturing device independently of the design of the energy-storage apparatus, it can optionally be provided that the load-spectrum-capturing device comprises a generator for generating electrical energy. From the movements of the machine occurring during an intended use of the machine element, for example rotations or oscillations, generators of this kind can convert a proportion of the kinetic energy into electrical energy and supply it to the energy-storage apparatus. Nanogenerators of this kind are known from practice in different variations and can obtain electrical energy from different energy sources, such as movements, pressure, temperature gradients or air flows; this is also referred to as energy harvesting.

In order to make it possible to use the measuring apparatus in parallel within the machine, according to an advantageous configuration of the concept of an aspect of the invention, it can optionally be provided that the load-spectrum-capturing device comprises a measured-data transmission apparatus for transmitting the measured data captured by means of the measuring apparatus, by means of which the measured data can be transmitted to an external analysis and control apparatus in a real-time-capable manner. Depending on the configuration of the data-transmission apparatus used to transmit the load-spectrum data, the measured data can be transmitted via the same data-transmission apparatus that is simultaneously being used as the measured-data transmission apparatus or can be transmitted via a separate measured-data transmission apparatus that uses a different data-transmission method and is, for example, better suited to transmitting larger data volumes or continuously transmitting individual items of measured data. The measured data captured by means of the measuring apparatus of the load-spectrum-capturing device can for example be transmitted to a control apparatus of the machine or used for the control or operation of the machine, while, independently therefrom, load-spectrum data are continuously determined and stored in the load-spectrum-capturing device.

The measured-data transmission apparatus can also implement a wired data-transmission method, for example, and can for example comprise an interface for a data-cable plug-in connection or a data-bus system. The measured data can be transmitted by means of the measured-data transmission apparatus in analogue or digital form.

It can also optionally be provided that a measuring apparatus of the machine that is intended and possibly required for the operation of the machine is combined with the other parts of the load-spectrum-capturing device in order to also make it possible to continuously capture load-spectrum data during the operation of the machine in addition to the use of the measuring apparatus. The design complexity involved in determining the load-spectrum data is then particularly low.

The load-spectrum-capturing device can for example be arranged on a machine element designed as a force transducer or torque transducer and a corresponding load spectrum can be captured proceeding from the forces or torques acting thereon. The machine element can also be designed as a rotating measuring flange, measuring spindle, load cell or as another sensor for capturing forces or torques in particular.

The invention also relates, according to an aspect thereof, to a machine element comprising a load-spectrum-capturing device, wherein the machine element is a hollow shaft, wherein the load-spectrum-capturing device having a combination of features as set out above is arranged in a cavity in the hollow shaft, and wherein the measuring apparatus of the load-spectrum-capturing device comprises a rotational-movement sensor, by means of which a rotational movement of the hollow shaft can be captured. In this way, the stress values that are relevant to shafts, such as a torque transmitted via the shaft or, alternatively, shear forces and axial forces, can be captured while the rotational speed of the rotating shaft is simultaneously recorded by an integrated acceleration sensor and other components having a rotational-speed-dependent service life, such as bearings or a gearbox, that are connected to the hollow shaft can thus also be monitored.

BRIEF DESCRIPTION OF THE DRAWINGS

In the following, embodiments of the concept of the invention which are shown schematically in the drawings are explained in greater detail. In the drawings.

DETAILED DESCRIPTION

Figure 1:
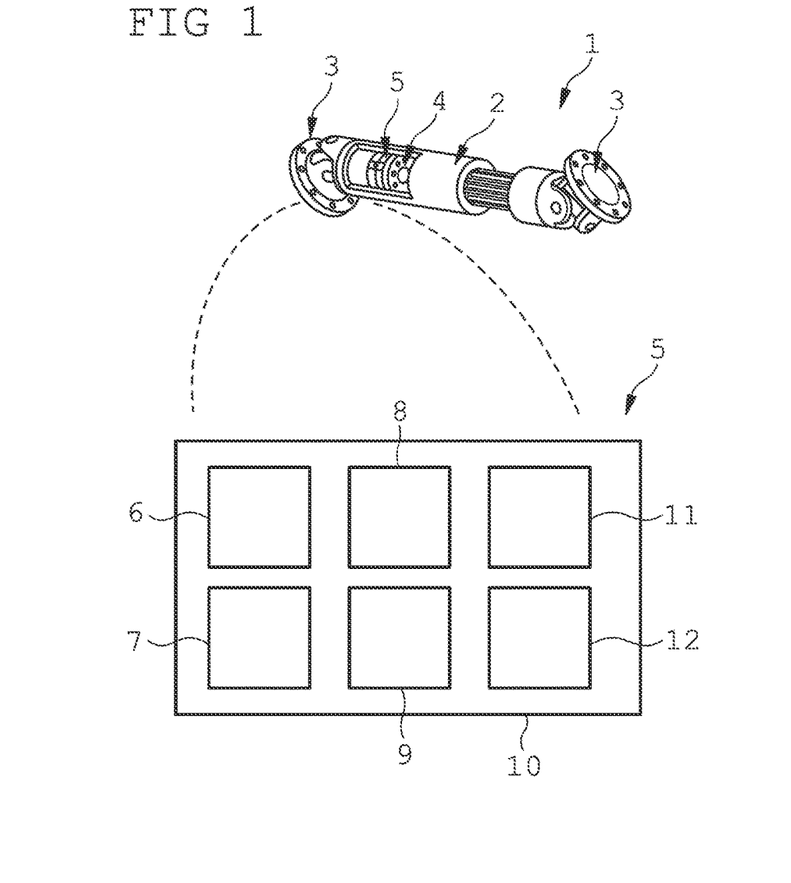
FIG. 1 is an exemplary view of a machine element comprising an additionally schematically shown load-spectrum-capturing device.

By way of example, FIG. 1 shows a machine element 1 which comprises a hollow-shaft portion 2 having two Cardan joints 3 attached to either opposite end of the hollow-shaft portion 2. A load-spectrum-capturing device 5 is arranged in the hollow-shaft portion 2 in a cavity 4 in the machine element 1 that is not accessible from the outside during the intended use of the machine element 1.

The load-spectrum-capturing device 5 comprises a measuring apparatus 6, by means of which measured data for mechanical stress acting on the machine element 1 can be captured. The measuring apparatus 6 can contain suitable force or moment sensors and other sensors or measuring elements by means of which relevant aspects of the mechanical stress on the machine element 1 can be captured. The load-spectrum-capturing device 6 also comprises a load-spectrum-determining apparatus 7, by means of which partial load-spectrum data can be calculated in accordance with a definable analysis and reduction method proceeding from the measured data captured by means of the measuring apparatus 6. The load-spectrum-capturing device 5 also comprises a data-memory apparatus 8, in which the calculated partial load-spectrum data can be stored. The load-spectrum-capturing device 5 also comprises an energy-supply apparatus 9 having an energy-storage apparatus (not shown separately), by means of which the measuring apparatus 6 and the load-spectrum-determining apparatus 7 are supplied with the electrical energy required for their operation.

The measuring apparatus 6, the load-spectrum-determining apparatus 7 and the data-memory apparatus 8 are attached together to or in a housing 10 of the load-spectrum-capturing device 5. The housing 10 can form a connecting support structure, to which the individual parts 6, 7, 8, 9 of the load-spectrum-capturing device 5 are attached so as to be accessible from the outside at least in part. The housing 10 can also surround an interior space protected from the surroundings, in which the individual parts 6, 7, 8, 9 are arranged.

The energy-storage apparatus can be an electric battery. The load-spectrum-capturing device 5 can optionally comprise a generator 11 for converting other forms of energy, such as kinetic energy or thermal energy, into electrical energy. By means of the generator 11, the energy-supply-storage apparatus 9 can be powered and energy can be transferred into the energy-storage apparatus and stored therein. In this case, the energy-storage apparatus is designed as a rechargeable accumulator.

The load-spectrum-capturing device 5 can also comprise a data-transmission apparatus 12 for transmitting load-spectrum data. The data-transmission apparatus 12 can be designed such that the load-spectrum data can be wirelessly transmitted to an external receiver. Measured data can optionally also be transmitted by means of the data-transmission apparatus 12. It is also conceivable for the load-spectrum-capturing device 5 to comprise, additionally or alternatively to the data-transmission apparatus 12, an interface that can be connected to a data-read-out device, by means of which interface the load-spectrum data stored in the data-memory apparatus 8 can be transmitted and read out.

Figure 2:
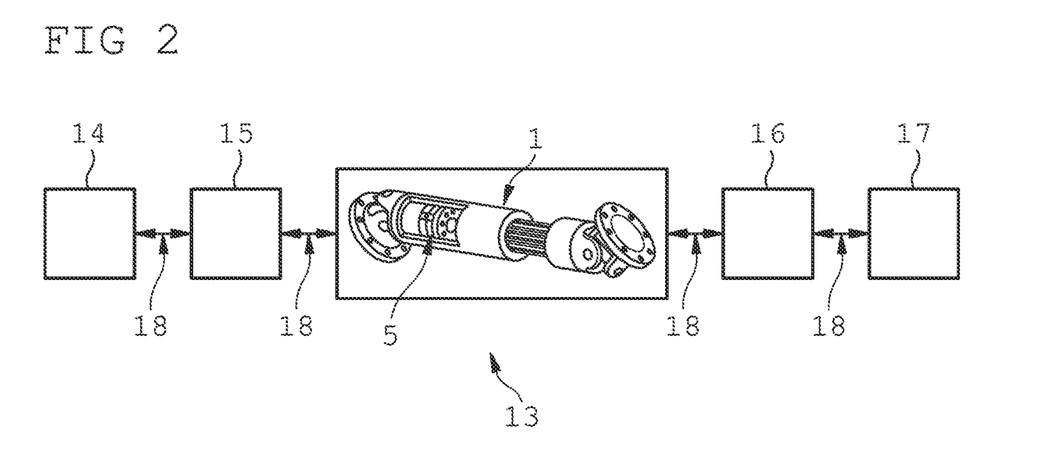
FIG. 2 is an exemplary view of the machine element integrated in a drive train of a vehicle.

FIG. 2 schematically shows a drive train 13 of a vehicle in which the machine element 1 is integrated as part of the drive train 13. The drive train 13 comprises a drive unit 14, for example an electric motor or an internal combustion engine, and a gearbox 15, which is connected to the machine element 1. The machine element 1 is subsequently connected to a differential 16, via which individual wheels 17 of the vehicle can be driven. The individual components 14, 15, 1, 16 and 17 of the drive train 13 are each interconnected for conjoint rotation by a suitable operative connection 18, such that a torque generated by the drive unit 14 can be transmitted via the individual components 14, 15, 1, 16, 17 over the drive train 13 and distributed between the individual wheels 17.

The load-spectrum-capturing device 5 can comprise a memory region in which component parameters for each of the individual components 14, 15, 1, 16 and 17 of the drive train 13 are stored. By means of the load-spectrum-determining apparatus 7, allocated load-spectrum data can then be determined for each component 14, 15, 1, 16 and 17 of the drive train and stored in the data-memory apparatus 8. In this way, updated load-spectrum data can be determined for all the components 14, 15, 1, 16 and 17 of the drive train 13 by means of a single load-spectrum-capturing device 5 and as a result the operational stability or a remaining service life of said components can be estimated and monitored.

Figure 3:
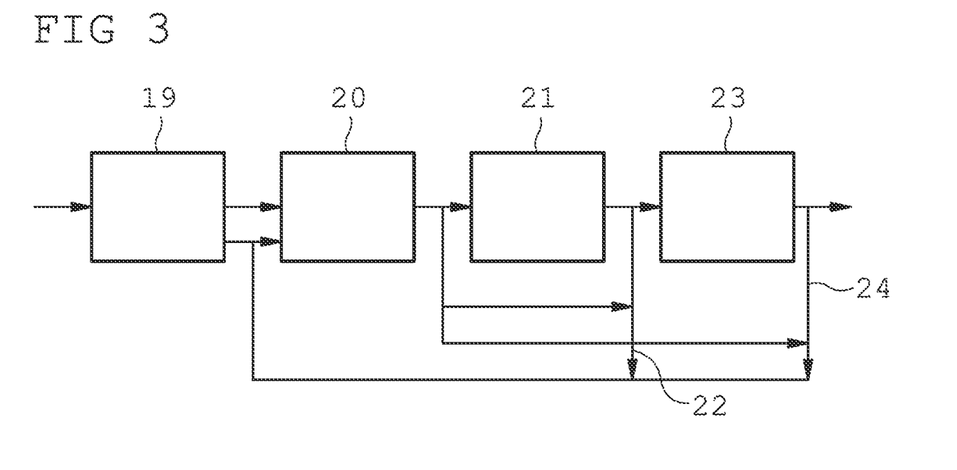
FIG. 3 shows a schematic method sequence for capturing a load spectrum.
Figure 4:
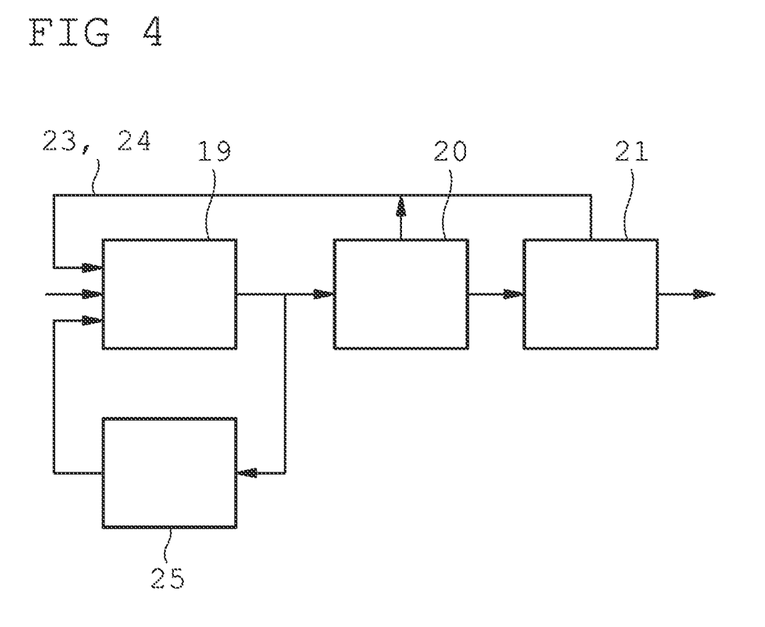
FIG. 4 shows a schematic method sequence for capturing a load spectrum, wherein measured data are captured in parallel by means of a measuring apparatus of the load-spectrum-capturing device and are transmitted to a control apparatus of a machine in which the machine element is used as intended.

FIGS. 3 and 4 schematically show different variants of the method according to an aspect of the invention. During the use of the machine element 1, measured data that are relevant for assessing the mechanical stress and the operational stability of the machine element 1 are continuously captured in a measured-data-capturing step 19 by means of the measuring apparatus 6. In predetermined time intervals or in time intervals individually determined or adapted by the load-spectrum-capturing device 5, new partial load-spectrum data are calculated in accordance with a predetermined method by means of the load-spectrum-determining apparatus in a load-spectrum-determining step 20 proceeding from the measured data captured in the meantime and from old partial load-spectrum data that are potentially already available.

In an optional, subsequent damage-occurrence estimation step 21, proceeding from the new partial load-spectrum data, a characteristic damage variable is determined for a probability measure of a predetermined damage occurrence to the machine element 1 coming about in the future. The characteristic damage variable also makes it possible to estimate a remaining service life of the machine element 1.

In an energy-saving operating mode, the new partial load-spectrum data determined in the load-spectrum-determining step 20 are stored in the data-memory apparatus 8, and there is a wait for another time interval before another load-spectrum-determining step 20 is carried out such that, after determining the partial load-spectrum data and optionally the characteristic damage variable, there is a return to the measured-data capturing 19 in a return step 22 and another load-spectrum-determining step 20 is then carried out. The up-to-date partial load-spectrum data are read out from the load-spectrum-capturing device 5 and transmitted to an external analysis apparatus in a data-transmitting step 23 only once the useful life of the machine element 1 has ended.

In a monitoring mode of the load-spectrum-capturing device 5, the new partial load-spectrum data, after being calculated in the load-spectrum-determining step 20, and optionally a characteristic damage variable determined in the damage-occurrence estimation step 20 are transmitted to an external analysis apparatus in a closely following data-transmitting step 23 via the data-transmission apparatus 9 before there is a return to the measured-data capturing 19 in a return step 24 and another load-spectrum-determining step 20 is then carried out.

In the variant of the method sequence according to an aspect of the invention shown in FIG. 4, after the measured-data-capturing step 19 and the capturing of measured data, the captured measured data are transmitted to a control apparatus of the machine in a measured-data-transmitting step 25 and are available for the control and operation of the machine. In parallel, proceeding from the measured data captured in the meantime, new partial load-spectrum data are calculated in a load-spectrum-determining step 20 and a characteristic damage variable is optionally determined.

Figure 5:
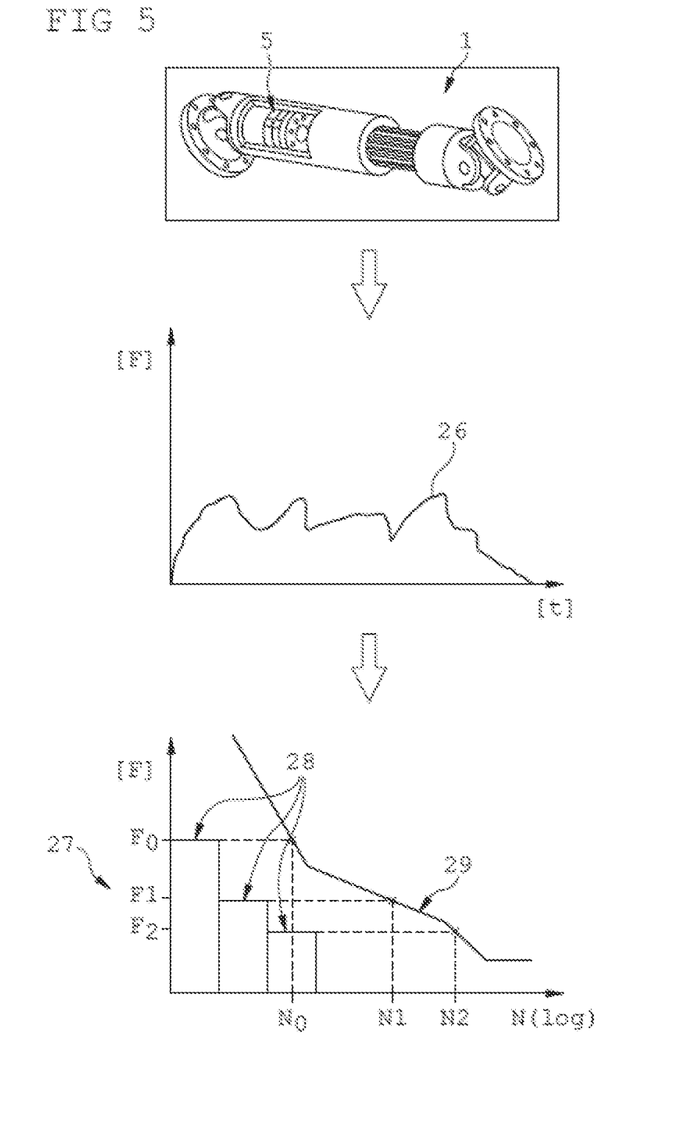
FIG. 5 is a schematic view of the method sequence from the capturing of measured data through to the determination of load-spectrum data.

In FIG. 5, steps of the method sequence according to an aspect of the invention are schematically summarized. By means of the load-spectrum-capturing device 5, as part of the measured-data capturing 19, measured data 26 relating to the mechanical stresses acting on the machine element 1 are continuously captured. Proceeding from predetermined parameters or classifications 27, new partial load-spectrum data, which for example describe the frequency N of an effective force 28 divided into different classes in accordance with a known counting method, such as the rainflow-counting method, are determined in each case proceeding from the measured data 26 and old partial load-spectrum data that are already available in a load-spectrum-determining step 20 that is repeated at time intervals. The partial load-spectrum data that are the most up to date at any one time form load-spectrum data that can be analyzed using a characteristic strength curve 29, such as a Wöhler line.

The invention claimed is:

1. Method for monitoring equipment including a machine element by analysis of a load spectrum of mechanical stresses which act on a machine element during an intended use, comprising capturing mechanical stresses acting on the machine element by a measuring apparatus of a load-spectrum-capturing device over a capturing period, proceeding from the measured data acting on the machine element and captured by the measuring apparatus, determining a load spectrum depicting the mechanical stresses acting on the machine element, calculating partial load-spectrum data at time intervals by a load-spectrum-determining apparatus of the load-spectrum-capturing device storing the measured data and the partial load-spectrum data in a data-memory apparatus of the load-spectrum-capturing device, wherein the partial load-spectrum data determined over the capturing period form a load-spectrum data set of a load spectrum, wherein, once partial load-spectrum data have been stored in the data-memory apparatus, a damage-occurrence estimation step is carried out and, proceeding from the partial load-spectrum data stored in the data-memory apparatus, a characteristic damage variable is determined for a probability measure of a predetermined damage occurrence to the machine element coming about in the future, and, after carrying out a damage-occurrence estimation step, the characteristic damage variable determined in this step is transmitted to an external analysis apparatus by a data-transmission apparatus of the load-spectrum-capturing device.

2. Method according to claim 1, wherein the load-spectrum data set is read out from the data-memory apparatus of the load-spectrum-capturing device and analyzed in a subsequent analysis step only once an intended use of the machine element has ended.

3. Method according to claim 1, wherein component parameters of components of a machine that are operatively connected to the machine element are stored in a component data-memory apparatus of the load-spectrum-capturing device and characteristic damage variables for the components that are operatively connected to the machine element are determined in the damage-occurrence estimation step.

4. Method according to claim 1, wherein the measured data captured by the measuring apparatus are transmitted to an external analysis or control apparatus relevant to the operation of the machine element or the machine by a measured-data transmission apparatus during the intended use of the machine element, wherein the measured-data transmission apparatus is configured and provided for real-time-capable transmission of the measured data.

5. Method according to claim 1, wherein, following a standby-state-initiating event, the load-spectrum-capturing device is transferred into an energy-saving standby state in which no measured data are captured by the measuring apparatus.

6. Method according to claim 5, wherein, by an activation event, the load-spectrum-capturing device is transferred into an operating state in which measured data are captured by the measuring apparatus and partial load-spectrum data are calculated and stored at time intervals proceeding from the captured measured data.

7. Method according to claim 1, wherein a time curve of the measured data captured by the measuring apparatus is compared with a plurality of previously predetermined reference curves and, when the time curve of the measured data corresponds to a reference curve, as established in accordance with predetermined correspondence criteria, partial load-spectrum data are stored for a separate reference-curve load spectrum allocated to this reference curve.

8. Load-spectrum-capturing device comprising
   a measuring apparatus for capturing mechanical stresses on a machine element,
   a load-spectrum-determining apparatus for determining load-spectrum data,
   a data-memory apparatus for storing the determined load-spectrum data, and
   a data-transmission apparatus for transmitting load-spectrum data to an external receiving apparatus for load-spectrum data,
   wherein the load-spectrum-capturing device comprises an energy-supply apparatus, which can provide electrical energy for operating the load-spectrum-capturing device from an energy-storage apparatus of the load-spectrum-capturing device.

9. Load-spectrum-capturing device according to claim 8, wherein the load-spectrum-capturing device comprises a generator for generating electrical energy, which is provided to the energy-supply apparatus.

10. Load-spectrum-capturing device according to claim 8, wherein the load-spectrum-capturing device comprises a measured-data transmission apparatus for transmitting the measured data captured by the measuring apparatus, by which the measured data can be transmitted to an external analysis and control apparatus in a real-time-capable manner.

11. Machine element comprising a load-spectrum-capturing device, wherein the machine element is a hollow shaft, wherein the load-spectrum-capturing device having the features of claim 8 is arranged in a cavity in the hollow shaft, and wherein the measuring apparatus of the load-spectrum-capturing device comprises a rotational-movement sensor, by which a rotational movement of the hollow shaft can be captured.

12. Method according to claim 1, comprising providing electrical energy for operating the load-spectrum-capturing device from an energy-storage apparatus of the load-spectrum-capturing device.

* * * * *